(12) United States Patent
Tanaka et al.

(10) Patent No.: US 9,978,540 B2
(45) Date of Patent: May 22, 2018

(54) INPUT OPERATION DEVICE

(71) Applicant: Panasonic Intellectual Property Management Co., Ltd., Osaka (JP)

(72) Inventors: Tsuyoshi Tanaka, Kyoto (JP); Hideaki Eto, Osaka (JP); Masami Ito, Osaka (JP); Shohroh Mochida, Osaka (JP); Shinji Kadoriku, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days. days.

(21) Appl. No.: 15/521,704

(22) PCT Filed: Oct. 28, 2015

(86) PCT No.: PCT/JP2015/005411
§ 371 (c)(1),
(2) Date: Apr. 25, 2017

(87) PCT Pub. No.: WO2016/079930
PCT Pub. Date: May 26, 2016

(65) Prior Publication Data
US 2017/0250037 A1    Aug. 31, 2017

(30) Foreign Application Priority Data
Nov. 18, 2014 (JP) .................. 2014-233249

(51) Int. Cl.
*G01D 11/28* (2006.01)
*H01H 9/18* (2006.01)
(Continued)

(52) U.S. Cl.
CPC .......... *H01H 9/182* (2013.01); *G02B 6/0068* (2013.01); *G02B 6/0076* (2013.01); *G05G 1/08* (2013.01);
(Continued)

(58) Field of Classification Search
CPC .... H01H 9/182; H01H 3/08; H01H 2219/062; H01H 2221/01; G05G 1/08; G02B 6/0068; G02B 6/0076
(Continued)

(56) References Cited

U.S. PATENT DOCUMENTS

2010/0200382 A1* 8/2010 Kim ..................... G02B 6/0051
200/314

FOREIGN PATENT DOCUMENTS

| CN | 201275871 Y * | 7/2009 |
| JP | 2012-001128 | 1/2012 |
| WO | 2010/140573 A1 | 12/2010 |

OTHER PUBLICATIONS

English Translation of WO 2010/140573A1 Ito et al. Dec. 9, 2010.*
(Continued)

*Primary Examiner* — Bao Q Truong
*Assistant Examiner* — Glenn Zimmerman
(74) *Attorney, Agent, or Firm* — Seed IP Law Group LLP

(57) ABSTRACT

An input operation device according to the present disclosure includes first to third light-emitting sections, a first light guide body, and a second light guide body. A lower end of the first light guide body faces the first light-emitting section and the second light-emitting section. The first mark emits light on the first light guide body when light is incident on the first light guide body from the first light-emitting section, and the second mark emits light on the first light guide body when light is incident on the first light guide body from the second light-emitting section. The upper surface section of the second light guide body emits light when light is incident on the second light guide body from the third light-emitting section. At least one of the first light-emitting section, the second light-emitting section, and the third light-emitting section can change light emission luminance.

12 Claims, 8 Drawing Sheets

(51) Int. Cl.
   *G05G 1/08*       (2006.01)
   *H01H 3/08*       (2006.01)
   *F21V 8/00*       (2006.01)
(52) U.S. Cl.
   CPC ......... *H01H 3/08* (2013.01); *H01H 2219/062* (2013.01); *H01H 2221/01* (2013.01)
(58) Field of Classification Search
   USPC ..................................................... 362/23.17
   See application file for complete search history.

(56)            References Cited

OTHER PUBLICATIONS

International Search Report of PCT application No. PCT/JP2015/005411 dated Jan. 26, 2016.
The Extended European Search Report dated Oct. 26, 2017 for the related European Patent Application No. 15860398.5.

* cited by examiner

INPUT OPERATION DEVICE

This application is a U.S. national stage application of the PCT International Application No. PCT/JP2015/005411 filed on Oct. 28, 2015, which claims the benefit of foreign priority of Japanese patent application 2014-233249 filed on Nov. 18, 2014, the contents all of which are incorporated herein by reference.

TECHNICAL FIELD

The present disclosure relates to an input operation device mounted to various electronic devices, a vehicle interior, or the like.

BACKGROUND ART

For automobiles, a configuration has been proposed in which an input operation device of every kind is mounted on a center cluster or the like in a vehicle interior.

For example, in an operation input panel unit disclosed in Patent Literature 1, a display is mounted on a center cluster. A plurality of input switches is provided around the display as input operation devices.

The conventional input switch is configured such that a light transmission section on which a character shape is displayed is provided on an operation surface thereof, and when the light transmission section is illuminated by an LED from the back surface side, the character displayed thereon is easy to be visually recognized.

CITATION LIST

Patent Literature

PTL 1: Unexamined Japanese Patent Publication No. 2012-001128

SUMMARY OF THE INVENTION

According to one aspect, the present disclosure provides an input operation device including a substrate, a first light-emitting section disposed on an upper surface of the substrate, a second light-emitting section disposed on the upper surface of the substrate, and a third light-emitting section disposed on the upper surface of the substrate. The input operation device further includes a first light guide body having an upper surface section and a side surface section, wherein a first mark and a second mark are formed on a lower surface of the upper surface section. The input operation device further includes a second light guide body having an upper surface section and a side surface section. An upper end of the side surface section of the first light guide body is connected to the upper surface section of the first light guide body, and a lower end of the side surface section of the first light guide body faces the first light-emitting section and the second light-emitting section. In addition, the first mark emits light on the upper surface section of the first light guide body when light is incident on the first light guide body from the first light-emitting section, and the second mark emits light on the upper surface section of the first light guide body when light is incident on the first light guide body from the second light-emitting section. The upper surface section of the second light guide body emits light when light is incident on the second light guide body from the third light-emitting section, and at least one of the first light-emitting section, the second light-emitting section, and the third light-emitting section can change light emission luminance.

Further, according to another aspect, the present disclosure provides an input operation device including a substrate, a first light-emitting section disposed on an upper surface of the substrate, a second light-emitting section disposed on the upper surface of the substrate, and a third light-emitting section disposed on the upper surface of the substrate. The input operation device further includes a first light guide body having an upper surface section and a side surface section, wherein a first mark and a second mark are formed on a lower surface of the upper surface section. The input operation device further includes a second light guide body having an upper surface section and a side surface section. An upper end of the side surface section of the first light guide body is connected to the upper surface section of the first light guide body, and a lower end of the side surface section of the first light guide body faces the first light-emitting section and the second light-emitting section. In addition, the first mark emits light on the upper surface section of the first light guide body when light is incident on the first light guide body from the first light-emitting section, and the second mark emits light on the upper surface section of the first light guide body when light is incident on the first light guide body from the second light-emitting section. The upper surface section of the second light guide body emits light when light is incident on the second light guide body from the third light-emitting section, and at least one of the first light guide body and the second light guide body is treated to enable light emission with gradation.

According to the present disclosure, the first mark and the second mark can be displayed on the same display region.

DESCRIPTION OF EMBODIMENT

Prior to the description of an input operation device according to the present exemplary embodiment, the problem of the input device disclosed in Patent Literature 1 will be described.

In the input switch disclosed in Patent Literature 1 described above, the shape of the light transmission section is determined in advance for one input switch. Therefore, the input device has the problem such that one input switch just has to be set to have a single function when being illuminated by the LED.

Input operation device 100 according to the present disclosure is accomplished to solve the conventional problem, and is configured to be capable of switching and displaying a plurality of marks with respect to one input operation section.

The input operation device according to the present disclosure will be described below with reference to the drawings.

Exemplary Embodiment

Figure 1:
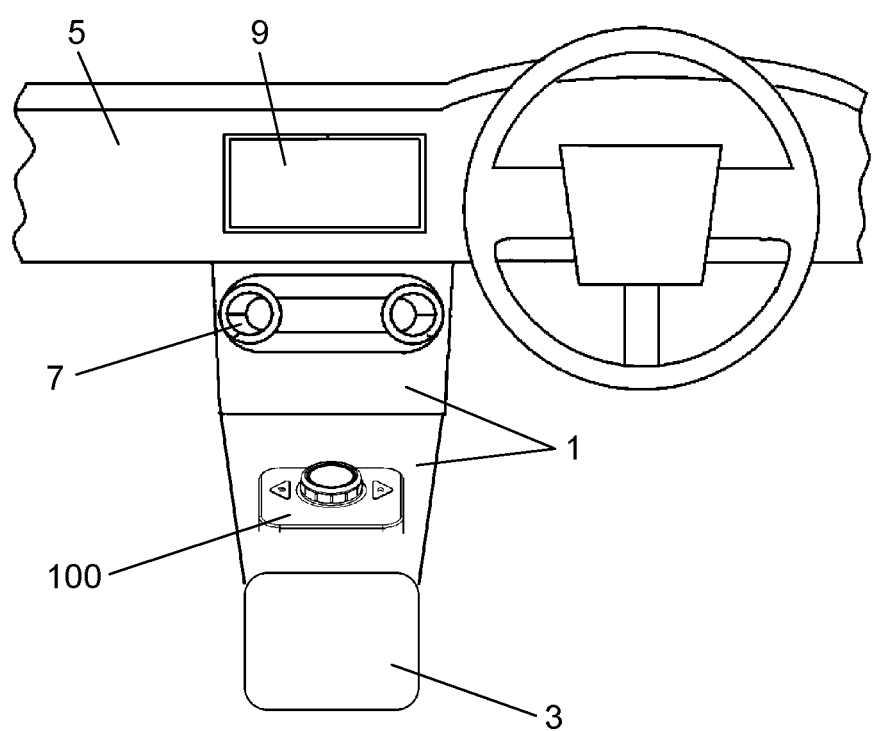
FIG. 1 is a view schematically illustrating a front part of a vehicle interior having mounted thereto an input operation device according to an exemplary embodiment.
Figure 2:
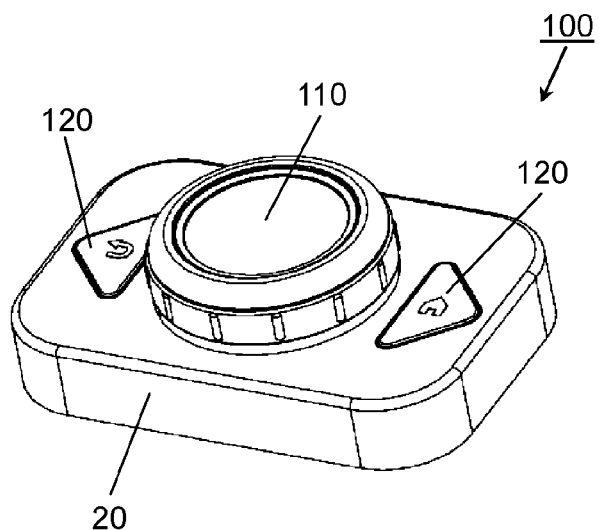
FIG. 2 is a perspective view illustrating an external appearance of the input operation device according to the exemplary embodiment.
Figure 3:
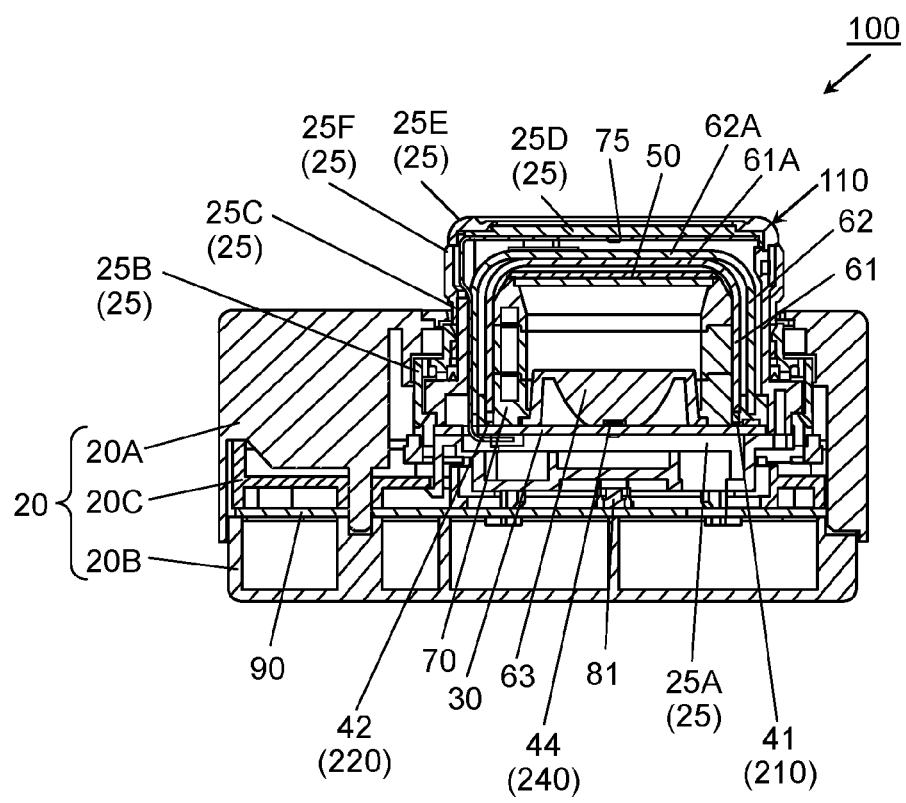
FIG. 3 is a sectional view of the input operation device according to the exemplary embodiment.
Figure 4:
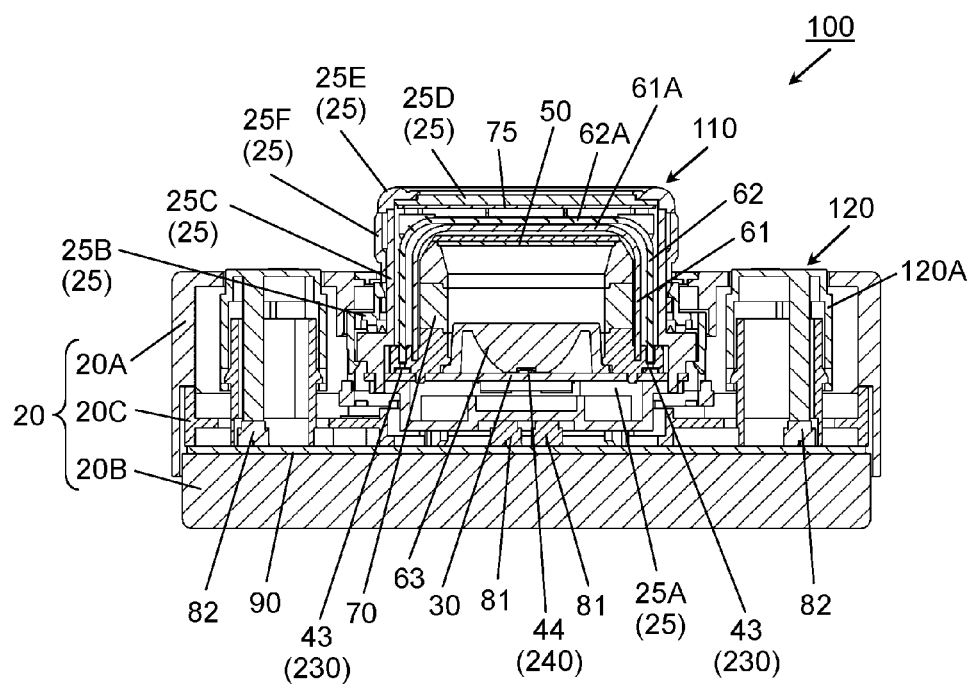
FIG. 4 is a sectional view of the input operation device according to the exemplary embodiment.
Figure 5:
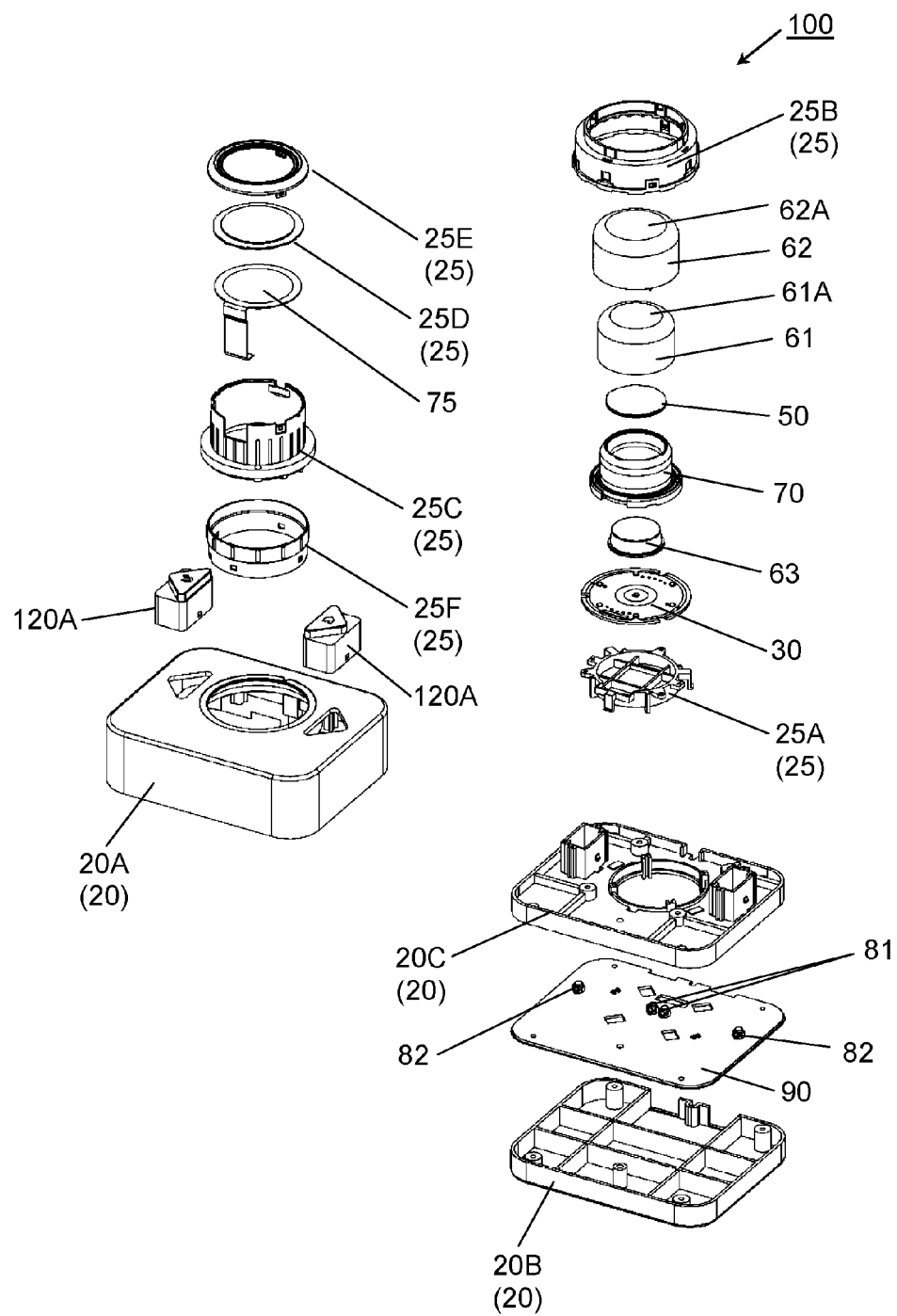
FIG. 5 is an exploded perspective view of the input operation device according to the exemplary embodiment.
Figure 6:
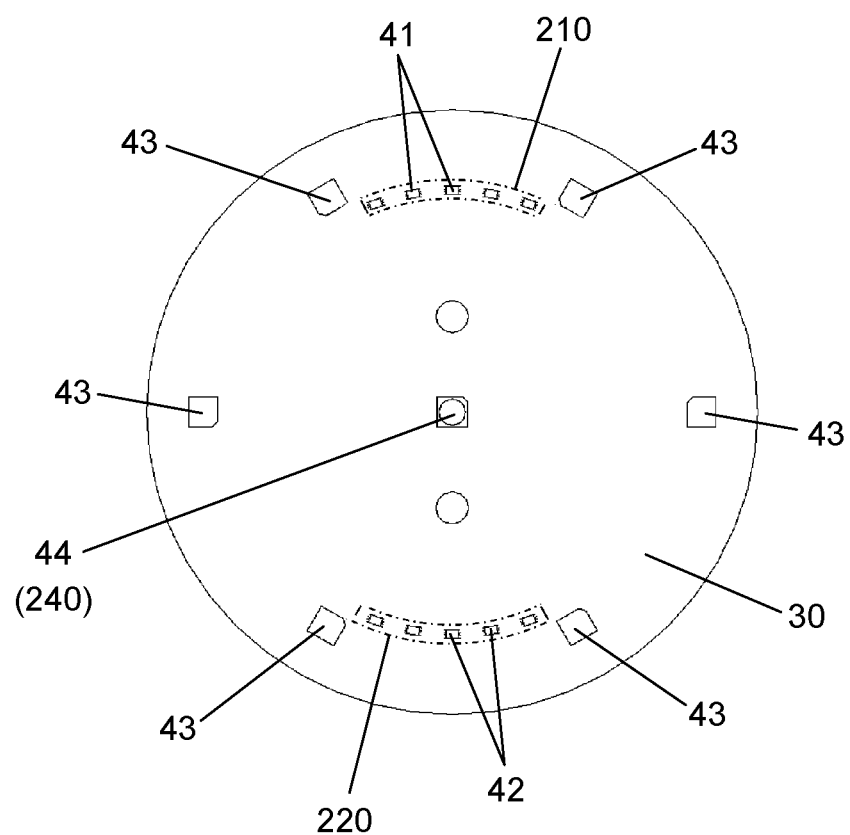
FIG. 6 is a top view of wiring board 30 in the input operation device according to the exemplary embodiment.
Figure 7:
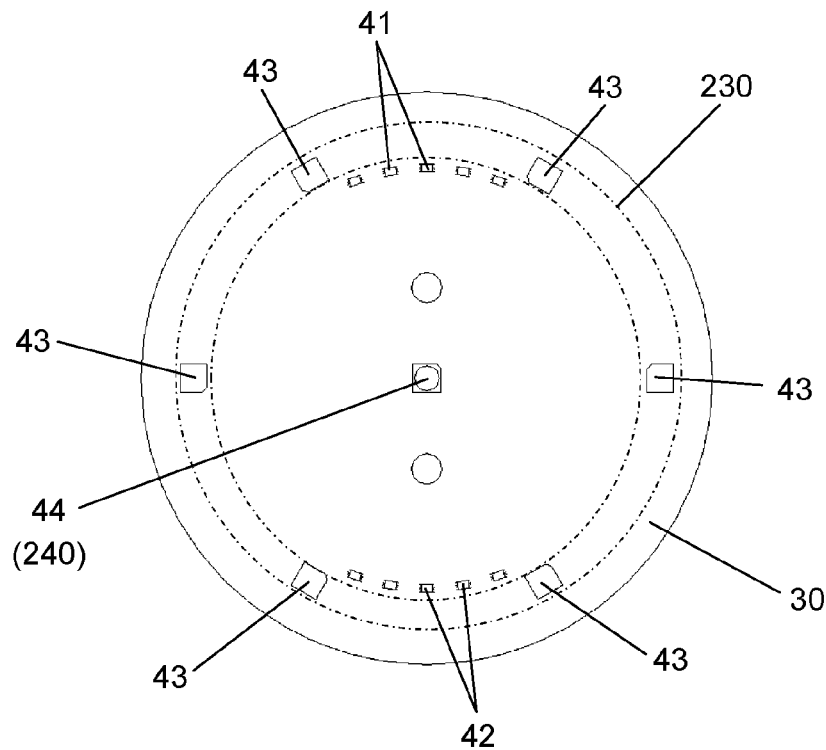
FIG. 7 is a top view of wiring board 30 in the input operation device according to the exemplary embodiment.
Figure 8:
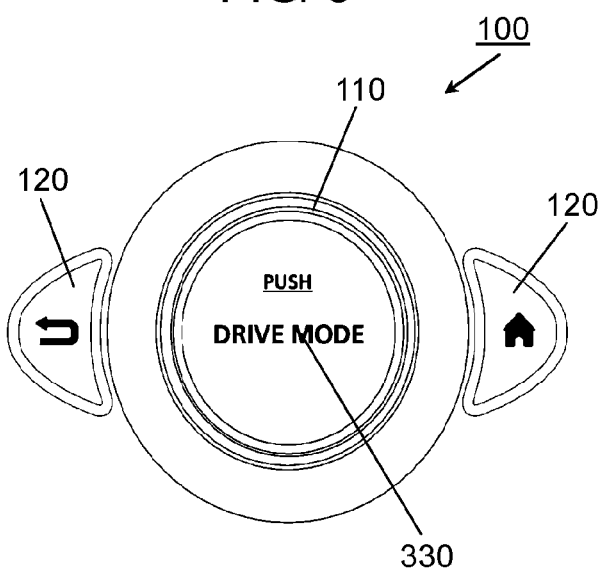
FIG. 8 is a view illustrating a state in which a third mark is displayed on a display region of an operation knob according to the exemplary embodiment.
Figure 9:
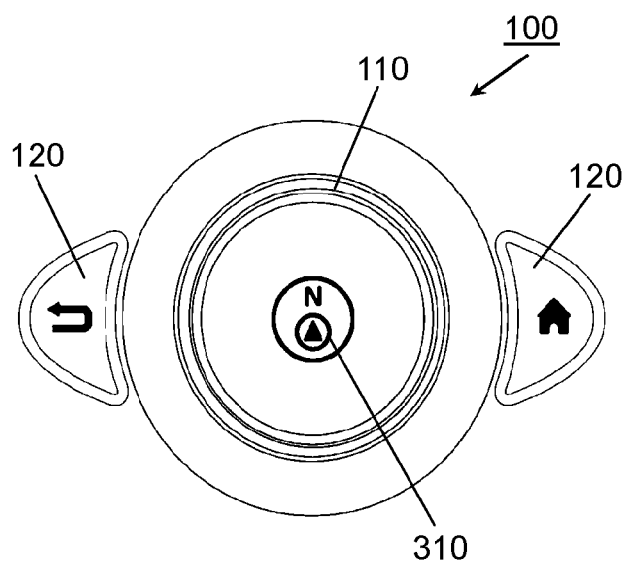
FIG. 9 is a view illustrating a state in which a first mark is displayed on the display region of the operation knob according to the exemplary embodiment.
Figure 10:
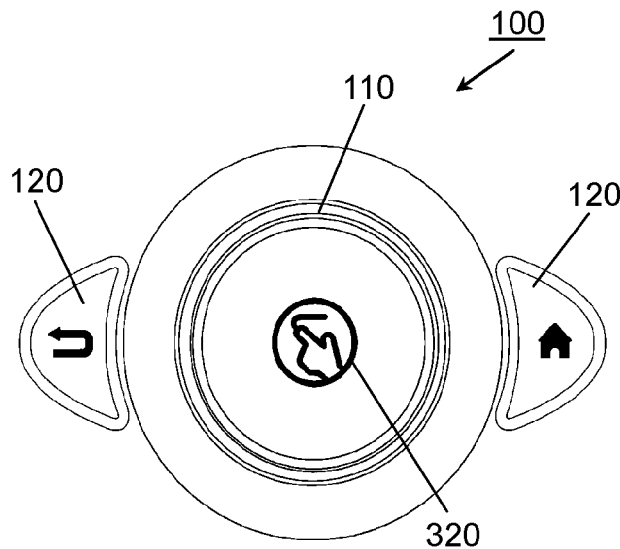
FIG. 10 is a view illustrating a state in which a second mark is displayed on the display region of the operation knob according to the exemplary embodiment.

FIG. 1 is a view schematically illustrating a front part of a vehicle interior having mounted thereto input operation device 100 according to an exemplary embodiment of the present disclosure. FIG. 2 is a perspective view illustrating an external appearance of input operation device 100. FIGS. 3 and 4 are sectional views of input operation device 100. FIG. 5 is an exploded perspective view of input operation device 100. FIGS. 6 and 7 are top views of wiring board 30 built in operation knob 110 of input operation device 100. FIG. 8 is a view illustrating a state in which a third mark is displayed in a display region of operation knob 110, FIG. 9 is a view illustrating a state in which a first mark is displayed in the display region, and FIG. 10 is a view illustrating a state in which a second mark is displayed in the display region.

As illustrated in FIG. 1, input operation device 100 according to the exemplary embodiment of the present disclosure is mounted on center console 1 disposed between two front seats in a vehicle interior in a vehicle such as an automobile.

Center console 1 is provided between center armrest 3 and instrument panel 5. The tilt of center console 1 near center armrest 3 is set to have an angle by which, when a person puts his/her arm on center armrest 3, the arm naturally fits the tilt.

Center console 1 is provided with air-conditioning operation panel 7, and the like. On instrument panel 5, display 9 and various operation switches (not illustrated) for performing predetermined operations are disposed.

As illustrated in FIG. 2, input operation device 100 has resinous case section 20, operation knob 110 projecting from case section 20, and push switch sections 120 each disposed on each side across operation knob 110.

As illustrated in FIGS. 3 to 5, case section 20 has upper case 20A, lower case 20B, and resinous plate-shaped intermediate case 20C. Intermediate case 20C is disposed on the position substantially intermediate of case section 20 in height.

Operation knob 110 has a columnar outer shape, and is configured to be capable of being touched on an upper end thereof. Operation knob 110 is also configured to be capable of being pressed. Operation knob 110 has a section that can be turned.

Operation knob 110 has a circular display region on the upper end thereof. The display region serves as a touch operation region. Each of push switch sections 120 is configured to be capable of being pressed.

As illustrated in FIGS. 3 to 5, operation knob 110 has knob structure 25 formed to have a columnar outer shape by combining a plurality of resinous members. Note that knob structure 25 may be configured to include members other than the resinous members. The shape of the resinous members composing knob structure 25 is arbitrary. Hereinafter, only the necessary portions of each resinous member will be described in detail to simplify the description of the resinous members.

As illustrated in FIGS. 3 to 5, the plurality of resinous members include substrate holder 25A, knob holder 25B, rotary member holder 25C, knob top surface 25D, top surface holder 25E, and ring-shaped operation member 25F. Substrate holder 25A, knob holder 25B, rotary member holder 25C, knob top surface 25D, and top surface holder 25E are connected to one another. In addition, ring-shaped operation member 25F is rotatably attached to rotary member holder 25C. Knob structure 25 is composed of these resinous members. Knob structure 25 has a hollow section. Knob structure 25 is disposed such that the top part thereof projects upward from a circular opening formed on upper case 20A. Knob structure 25 is entirely movable downwardly.

Input operation device 100 is configured such that the emission states of light-emitting section 210, light-emitting section 220, and light-emitting section 230 are switched by operating knob structure 25. The switching of emission states of light-emitting section 210, light-emitting section 220, and light-emitting section 230 will be described later. Note that an on-off control of a switch, volume control, or temperature control is performed by means of knob structure 25.

Operation knob 110 includes knob structure 25, wiring board 30, light-emitting elements 41 to 44 mounted on the upper surface of wiring board 30, design plate 50, and light guide bodies 61 to 63. The arrangement of light-emitting elements 41 to 44 will be described later with reference to FIG. 6 and FIG. 7.

Wiring board 30 is fixed on the upper surface of substrate holder 25A of knob structure 25.

Next, the arrangement of light-emitting elements 41 to 44 will be described with reference to FIG. 6 and FIG. 7.

Light-emitting element 44 is mounted on the center of wiring board 30. One light-emitting element 44 constitutes light-emitting section 240.

Light-emitting section 210 is indicated by a dot-and-dash line in FIG. 6. Note that the dot-and-dash line indicating light-emitting section 210 and reference mark 210 are not illustrated in FIG. 7. Light-emitting section 210 includes five light-emitting elements 41, and is formed on the upper surface of wiring board 30 in a circular arc around light-emitting section 240. Specifically, the plurality of light-emitting elements 41 is arrayed and mounted on wiring board 30 within a range of a predetermined angle (for example, the range of 60 degrees) in a circular ring shape around light-emitting section 240.

Like light-emitting section 210, light-emitting section 220 is indicated by a dot-and-dash line in FIG. 6. Note that the dot-and-dash line indicating light-emitting section 220 and reference mark 220 are not illustrated in FIG. 7. Light-emitting section 220 includes five light-emitting elements 42, and is formed on the upper surface of wiring board 30 in a circular arc around light-emitting section 240. Specifically, the plurality of light-emitting elements 42 is arrayed and mounted on wiring board 30 within a range of a predetermined angle (for example, the range of 60 degrees) in a circular ring shape around light-emitting section 240.

Notably, while light-emitting section 210 and light-emitting section 220 are mounted to have point symmetrical relation about light-emitting section 240 in the present exemplary embodiment, they do not necessarily have a point symmetrical relation.

Light-emitting section 230 is indicated by a dot-and-dash line in FIG. 7. Light-emitting section 230 is formed in a concentric circular ring shape on an outer circumferential position of light-emitting section 210 and light-emitting section 220. That is, a plurality of light-emitting elements 43 is arranged on light-emitting section 230 at regular intervals. In the present exemplary embodiment, six light-emitting elements 43 are disposed in a ring at an interval of 60 degrees near the outer circumference of circular wiring board 30 to form light-emitting section 230. Note that light-emitting elements 43 are not necessarily disposed at an interval of 60 degrees, and not necessarily disposed at regular intervals.

Wiring board 30 having light-emitting sections 210, 220, 230, and 240 is mounted in knob structure 25. In addition, light guide bodies 61 to 63 and the like are disposed above wiring board 30 (see FIGS. 3 to 5).

Figure 11:
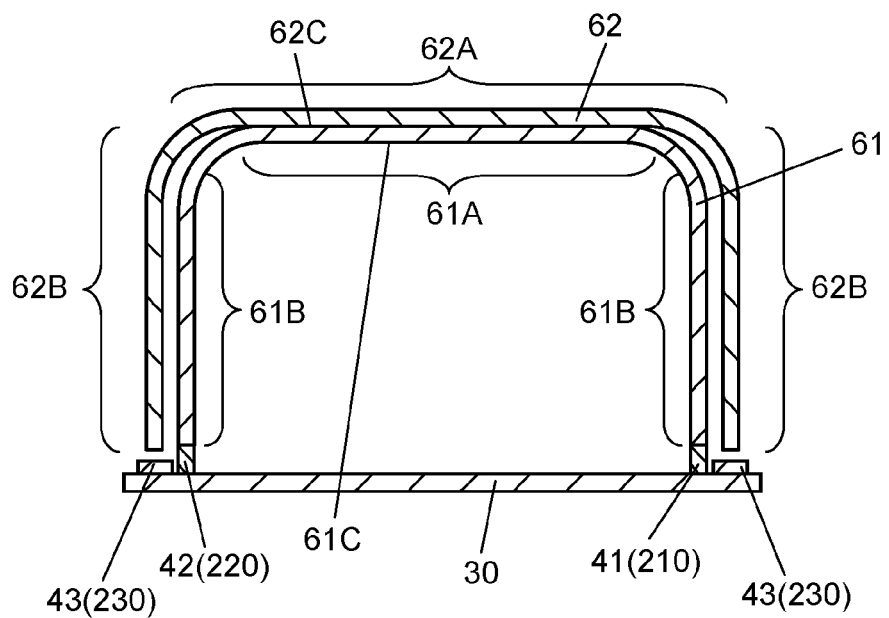
FIG. 11 is a schematic view for describing the positional relation between light guide bodies and light-emitting sections in the input operation device according to the exemplary embodiment.

Here, the positional relation among light guide body 61, light guide body 62, light-emitting elements 41, light-emitting elements 42, and light-emitting elements 43 will be described with reference to FIG. 11. FIG. 11 is a schematic view for describing the positional relation between the light guide bodies and the light-emitting elements.

It is to be noted that, in the input operation device described with reference to FIG. 6 in the present exemplary embodiment, light-emitting elements 41 and 42 and light-emitting element 43 are not originally illustrated in the same sectional view. However, for easy understanding of the vertical positional relation, light-emitting element 41, light-emitting element 42, and light-emitting element 43 are illustrated in the same sectional view of FIG. 11 for the sake of convenience. Therefore, FIG. 6 and FIG. 11 are not consistent with each other, for example. Light-emitting element 44 is not illustrated in FIG. 11.

As illustrated in FIG. 11, light guide body 61 has upper surface section 61A and side surface section 61B. The upper end of side surface section 61B of light guide body 61 is connected to upper surface section 61A of light guide body 61. Light guide body 62 has upper surface section 62A and side surface section 62B. The upper end of side surface section 62B of light guide body 62 is connected to upper surface section 62A of light guide body 62.

A mark is formed on lower surface 61C of upper surface section 61A of light guide body 61. Another mark is formed on lower surface 62C of upper surface section 62A of light guide body 62. Although described in detail later, in the present exemplary embodiment, two types of marks are formed on lower surface 61C of upper surface section 61A of light guide body 61 so as to emit light, and lower surface 62C of upper surface section 62A of light guide body 62 is treated to enable emission of light with gradation.

Light-emitting elements 41, 42, and 43 (light-emitting sections 210, 220, and 230) are mounted on the upper surface of wiring board 30. One side of the lower end of side surface section 61B of light guide body 61 faces light-emitting elements 41 and the other faces light-emitting elements 42. Light guide body 61 guides light from light-emitting elements 41 (light-emitting section 210) and light-emitting elements 42 (light-emitting section 220).

Note that, in the present exemplary embodiment, side surface sections 61B and 62B are tubular. However, it is only necessary that side surface section 61B and upper surface section 61A are connected to each other, and it is not always necessary that side surface section 61B is tubular. Similarly, it is only necessary that side surface section 62B and upper surface section 62A are connected to each other, and it is not always necessary that side surface section 62B is tubular.

Next, the rest of the configuration of the input operation device will be described with reference to FIGS. 3 to 5. Since light guide body 61, light guide body 62, light-emitting elements 41, light-emitting elements 42, and light-emitting elements 43 have been described above in detail, they are identified by the same reference marks, and the description thereof will be omitted.

Light guide body 63 is placed on the center of wiring board 30. Light-emitting element 44 (light-emitting section 240) is disposed below light guide body 63. Light-emitting element 44 is mounted on the upper surface of wiring board 30. Light guide body 63 guides light from light-emitting element 44 (light-emitting section 240).

Light guide body 63 has a flanged outer circumferential section. The flanged outer circumferential section of light guide body 63 is pressed by the lower end of light-shielding tubular body 70 from top, and held between tubular body 70 and tubular wiring board 30. According to this configuration, light guide body 63 is positioned.

Tubular body 70 is formed into a tubular shape by combining three resinous members which are vertically stacked. Tubular body 70 is formed from a material having a color for preventing radiation of light from light-emitting section 240 to the outside thereof. Alternatively, tubular body 70 may be configured to shield light by painting the outer circumference surface or the inner circumferential surface thereof. Light guide body 63 has a surface section disposed above light-emitting section 240 in the region surrounded by tubular body 70.

[Emission of Input Operation Device]

Next, emission of light in input operation device 100 will be described with reference to FIGS. 1 to 4 and 6 to 8.

<Emission of Light Guide Body 63>

The surface section of light guide body 63 transmits light of light-emitting section 240 entering from the lower surface. Light guide body 63 has a shape to emit light from the upper surface side thereof to the inside of tubular body 70. The light passing through the surface section of light guide body 63 is reflected inside tubular body 70 to reach the upper part of tubular body 70. This light illuminates design plate 50 attached on the top surface of tubular body 70. A character string "PUSH DRIVE MODE" (hereinafter referred to as mark 330) is formed on a light transmission section of design plate 50.

Design plate 50 is attached on a top surface member of tubular body 70. The top surface member of tubular body 70 is formed from a material having light transparency. Although described in detail later, touch sensor 75 and knob top surface 25D are disposed above the top surface member of tubular body 70. Touch sensor 75 and knob top surface 25D are also formed from a material having light transparency.

When the character or the like formed on the light transmission section of design plate 50 is illuminated, mark 330 is illuminated and displayed on the display region on the upper surface of operation knob 110 as illustrated in FIG. 8.

Light guide body 61 formed from an acrylic plate or the like having uniform thickness is disposed inside of knob structure 25 and outside of tubular body 70. Light guide body 61 has a cylindrical shape with an inner diameter larger than the outer diameter of tubular body 70, wherein the upper part of side surface section 61B is closed by upper surface section 61A.

When light is incident in the plate thickness of light guide body 61 from the end surface position, light guide body 61 guides the incident light while allowing this light to be reflected in the plate thickness.

The lower end surface of light guide body 61 faces light-emitting section 210 (light-emitting elements 41) and light-emitting section 220 (light-emitting elements 42) in the vertical direction. Specifically, in input operation device 100 according to the present exemplary embodiment, an incidence section of light from light-emitting section 210 and light-emitting section 220 to light guide body 61 is set to a region below the lower end surface of light guide body 61. Note that side surface section 61B of light guide body 61 is not necessarily tubular, and may only have a shape facing at least light-emitting section 210 and light-emitting section 220.

Light guide body 61 guides light entering from the lower end surface in the plate thickness to upper surface section 61A. Upper surface section 61A is subjected to a treatment for reflecting and scattering the guided light upward on a predetermined mark. Hereinafter, the predetermined mark that emits light on upper surface section 61A of light guide body 61 is supposed to be mark 310 (see FIG. 9) or mark 320 (see FIG. 10) in the present exemplary embodiment.

When the light incident on light guide body 61 from light-emitting section 210 is reflected and scattered, mark 310 on upper surface section 61A illustrated in FIG. 9 emits light upward. On the other hand, when the light incident on light-emitting section 220 is reflected and scattered, mark 320 on upper surface section 61A illustrated in FIG. 10 emits light upward.

In input operation device 100 according to the present exemplary embodiment, the region of light guide body 61 where mark 310 is formed and the region of light guide body 61 where mark 320 is formed are at least partially overlapped with each other. Normally, input operation device 100 is controlled so that light-emitting section 210 and light-emitting section 220 are not simultaneously turned on.

Note that light from light-emitting element 44 (light-emitting section 240) is shielded by tubular body 70, thereby not reaching side surface section 61B of light guide body 61. However, out of light emitted from light-emitting element 44, light passing through the design plate and being emitted upward reaches upper surface section 61A of light guide body 61. However, the light being emitted upward passes through upper surface section 61A, thereby not affecting the light emission of mark 310 and mark 320 on light guide body 61.

Light guide body 62 formed from an acrylic plate or the like having uniform thickness is disposed inside of knob structure 25 and outside of light guide body 61. That is, light guide body 62 is a cylindrical body slightly higher than light guide body 61 and having an inner diameter larger than the outer diameter of light guide body 61. The upper part of side surface section 62B of light guide body 62 is closed by upper surface section 62A. The lower end thereof has a circular ring shape, and the lower end of side surface section 61B is on the same level.

Like light guide body 61, when light is incident in the plate thickness of light guide body 62 from the end surface position, light guide body 62 guides the incident light while allowing this light to be reflected in the plate thickness.

The lower end surface of light guide body 62 having the circular ring shape faces light-emitting section 230 (light-emitting elements 43) in the vertical direction. Specifically, in input operation device 100 according to the present exemplary embodiment, an incidence section of light from light-emitting section 230 to light guide body 62 is set to a region below the lower end surface of light guide body 62. Note that side surface section 62B of light guide body 62 is not necessarily tubular, and may only have a shape facing at least light-emitting section 230.

Light guide body 62 allows the light entering from the lower end surface to be incident in the plate thickness, and guides this light to upper surface section 62A. Upper surface section 62A is subjected to a treatment for reflecting and scattering the guided light upward.

In input operation device 100 according to the present exemplary embodiment, the treatment for concentrically reducing the reflection scattering degree toward the center is employed as a reflection scattering state of light. That is, the surface of light guide body 62 is treated for enabling light emission with gradation. Note that the treatment for reducing the reflection scattering degree toward the center is only one example, and various gradations are possible.

In addition, it is not always necessary to enable light emission with gradation. Light with constant luminance may be emitted.

It is to be noted that the lower end surface of light guide body 61 and the lower end surface of light guide body 62 are both located on a side projecting section provided on the circumferential edge of tubular body 70. They face corresponding light-emitting section 210, light-emitting section 220, and light-emitting section 230 through through-holes formed on the side projecting section. The side projecting section is provided with a partition for preventing the mixture of light from light-emitting section 210 and light from light-emitting section 220 or light-emitting section 230.

Knob top surface 25D of knob structure 25 is located above upper surface section 62A of light guide body 62. Top surface holder 25E is fixed to rotary member holder 25C while holding the circumferential edge of knob top surface 25D. Touch sensor 75 is fixed to the lower surface of knob top surface 25D by means of an adhesive or the like. Knob top surface 25D and touch sensor 75 have light transparency.

Touch sensor 75 is connected to a sensor controller (not illustrated). When the upper surface of knob top surface 25D is touched by a finger or the like, the sensor controller detects the touched position.

Knob structure 25 is installed to case section 20 so as to be capable of being pressed.

Self-reset switch 81 is disposed below knob structure 25. When knob structure 25 is pressed, the state of switch 81 is switched.

Switch 81 is mounted on wiring board 90 held between intermediate case 20C and lower case 20B.

Wiring board 90 is provided with the above-mentioned sensor controller and an illumination controller (not illustrated) for controlling on-off of first light-emitting section 210 to fourth light-emitting section 240. Wiring board 90 is also provided with a rotation detector that detects the rotation state of ring-shaped operation member 25F. These components may be provided on a section other than wiring board 90.

In addition, self-reset switches 82 are disposed on wiring board 90. Each of switches 82 is activated and the state thereof is switched, when button member 120A of corresponding push switch section 120 is pressed.

Input operation device 100 is configured as described above.

[Example of Change in Emission State of Input Operation Device 100]

Next, one example of a change in an emission state of input operation device 100 will be described.

<First State (Normal State)>

In input operation device 100, mark 330 is illuminated to be visible in the display region on the upper end of operation knob 110, as a first state, as illustrated in FIG. 8. The first state is generally referred to as a "normal state". In the first state, only light-emitting section 240 emits light, and light-emitting sections 210, 220, and 230 are turned off. That is, light guide body 63 emits light from the upper surface side thereof to the inside of tubular body 70. The light is reflected inside tubular body 70 to reach the upper part of tubular body 70. This light illuminates design plate 50 attached on the top surface of tubular body 70, whereby mark 330 illustrated in FIG. 8 is displayed in the display region on the upper surface of operation knob 110.

<Second State (State in which Mark in FIG. 9 is Displayed)>

When a mode for using navigation is set, for example, by a predetermined operation while in the first state, a map and a pointer (see mark 310 illustrated in FIG. 9) for indicating a current position are displayed on display 9. At that time, the pointer on the map is switched to a movable state by the operation of operation knob 110. This state is referred to as a second state in the present exemplary embodiment.

In the second state, input operation device 100 is controlled so that light-emitting section 220 and light-emitting section 240 are turned off and light-emitting section 210 is turned on. The on-off control of light-emitting section 230 will be described later.

In the second state, input operation device 100 is switched to the state in which mark 310 illustrated in FIG. 9 is illuminated in the display region set on the upper end of operation knob 110. Specifically, light from light-emitting section 210 is incident on light guide body 61, and the incident light reaches upper surface section 61A of light guide body 61. With this, mark 310 formed on lower surface 61C of upper surface section 61A emits light, whereby mark 310 is illuminated on the display region on an input operation section.

In addition, at the same time as the illumination of mark 310 in the display region on the input operation section, the pointer displayed on display 9 is controlled to be movable according to the touch operation on the upper end of operation knob 110. That is, the detection by touch sensor 75 is performed, and the pointer displayed on display 9 is controlled. Specifically, the pointer on the map displayed on display 9 moves in the corresponding direction according to the track of the touch operation on the upper end of operation knob 110. In addition, display 9 is controlled such that the map on the display 9 is enlarged around the portion indicated by the pointer according to a switch signal which is output when the state of switch 81 is switched due to the depression of operation knob 110. It is to be noted that the change in the content to be displayed on display 9 by the predetermined operation is only one example for describing input operation device 100 according to the present exemplary embodiment, and not limited thereto.

<Third State (State in which Mark in FIG. 10 is Displayed)>

When input operation device 100 is set to a handwriting input mode by a predetermined operation while in the third state, display 9 is controlled to display characters input to input operation device 100 by handwriting. This state is referred to as a third state in the present exemplary embodiment.

In the third state, input operation device 100 is controlled so that light-emitting section 210 and light-emitting section 240 are turned off and light-emitting section 220 is turned on. The on-off control of light-emitting section 230 will be described later.

In the third state, input operation device 100 is switched to the state in which mark 320 illustrated in FIG. 10 is illuminated in the display region set on the upper end of operation knob 110. Specifically, light from light-emitting section 220 is incident on light guide body 61, and the incident light reaches upper surface section 61A. With this, mark 320 formed on lower surface 61C of upper surface section 61A emits light, whereby mark 320 is illuminated in the display region on the input operation section. Note that the transfer from the first state to the third state and the transfer from the second state to the third state are implemented by the similar operating state.

In addition, input operation device 100 is controlled such that the track of the touch operation on the upper end of operation knob 110 is detected through touch sensor 75, at the same time as the illumination of mark 320 in the display region on the input operation section. That is, the characters or the like handwritten on the upper end of operation knob 110 is displayed on display 9. The determination or the like of the characters is made by a switch signal from switch 81 due to the depression of operation knob 110.

As described above, input operation device 100 according to the present exemplary embodiment is configured so that any one of marks 310, 320, and 330 is illuminated to be visible in the display region of operation knob 110.

With respect to the illumination of marks 310 and 320, marks 310 and 320 are switched to emit light on upper surface section 61A of light guide body 61. According to this configuration, two marks can be illuminated by one light guide body 61, whereby the number of components can be reduced, and the production process can be simplified.

<Operation of Light Guide Body 62 and Light-Emitting Section 230>

Input operation device 100 according to the present exemplary embodiment further includes light-emitting section 230 and light guide body 62. Light-emitting section 230 can be turned on in conjunction with the illumination of light guide body 61 in the first to third states.

That is, when light-emitting section 230 (light-emitting elements 43) is turned on, light from light-emitting section 230 is incident on light guide body 62 from the lower end surface. This light reaches upper surface section 62A of light guide body 62, so that upper surface section 62A emits light. Lower surface 62C of upper surface section 62A of light guide body 62 is subjected to a treatment for concentrically reducing a light reflection scattering degree toward the inner side. Therefore, upper surface section 62A emits light in a surface emission state with gradation in which the luminance is concentrically lowered toward the center of the circular ring. In other words, the illumination state with gradation is implemented in the display region of operation knob 110.

When light-emitting section 230 is turned on with mark 310 (or mark 320 or mark 330) being illuminated, mark 310

(or mark 320 or mark 330) is visible in the illumination state with gradation in the display region of operation knob 110.

In addition, contrast of illumination in gradation can be generated by changing current or voltage to be applied to light-emitting elements 43. While lower surface 62C of light guide body 62 is treated to enable surface emission with gradation in the present exemplary embodiment, it is not necessarily treated to enable light emission with gradation. It may be treated to enable light emission with constant luminance.

In the configuration not subjected to the gradation treatment, the monotonous luminance of light emitted from light guide body 62 can be varied by changing current or voltage to be applied to light-emitting elements 43. Note that, in the configuration subjected to the gradation treatment, the luminance may also be varied.

Alternatively, an illumination state other than gradation can be implemented by switching on/off of each of light-emitting elements 43 in a determined order.

Push switch sections 120 provided on both sides of operation knob 110 may be assigned for a home key or a return key to allow input operation device 100 to return to the first state, for example.

As is apparent from the above description, operation knob 110 is adaptable to a plurality of operating states. A character or the like according to each operation function is switched and illuminated in the same display region of operation knob 110. Particularly, two marks (mark 310 and mark 320) can be illuminated on operation knob 110 of input operation device 100 in the present exemplary embodiment using only one light guide body 61. Therefore, downsizing and reduction in weight of operation knob 110 can be achieved.

Input operation device 100 described above in the present exemplary embodiment can be configured as described below.

Input operation device 100 enables surface light emission from light guide body 62 with luminance being varied, while light guide body 61 allows mark 310 or mark 320 to emit light.

Specifically, the input operation device according to the present exemplary embodiment includes wiring board 30, light-emitting section 210 disposed on an upper surface of wiring board 30, light-emitting section 220 disposed on the upper surface of wiring board 30, and light-emitting section 230 disposed on the upper surface of wiring board 30. The input operation device further includes light guide body 61 having upper surface section 61A and side surface section 61B, wherein a first mark (for example, mark 310) and a second mark (for example, mark 320) are formed on a lower surface of upper surface section 61A. The input operation device further includes light guide body 62 having upper surface section 62A and side surface section 62B. An upper end of side surface section 61B of light guide body 61 is connected to upper surface section 61A of light guide body 61, and a lower end of side surface section 61B of light guide body 61 faces light-emitting section 210 (light-emitting elements 41) and light-emitting section 220 (light-emitting elements 42). The first mark (for example, mark 310) emits light on upper surface section 61A of light guide body 61 when light is incident on light guide body 61 from light-emitting section 210. The second mark (for example, mark 320) emits light on upper surface section 61A of light guide body 61 when light is incident on light guide body 61 from light-emitting section 220 (light-emitting elements 42). In addition, upper surface section 62A of light guide body 62 emits light when light is incident on light guide body 62 from light-emitting section 230 (light-emitting elements 43).

At least one of light-emitting section 210, light-emitting section 220, and light-emitting section 230 can change light emission luminance.

According to the configuration described above, an input operation device can be implemented in which mark 310 is used as a sound volume display mark, and sound volume and luminance of light emitted by light guide body 62 are associated with each other to visually recognize the volume.

Besides, for example, an input operation device can be implemented in which mark 320 is used as mark for indicating that an air-conditioner is being activated, and a set temperature and luminance of light emitted by light guide body 62 are associated with each other to visually recognize the set temperature.

As described above, the operation of the input operation device can be visually simplified by the combination of the mark display and luminance.

Input operation device 100 described above in the present exemplary embodiment can also be configured as described below.

Input operation device 100 enables light emission with gradation from light guide body 62, while light guide body 61 allows one of marks 310 and 320 to emit light.

Specifically, the input operation device according to the present exemplary embodiment includes wiring board 30, light-emitting section 210 disposed on an upper surface of wiring board 30, light-emitting section 220 disposed on the upper surface of wiring board 30, and light-emitting section 230 disposed on the upper surface of wiring board 30. The input operation device further includes light guide body 61 having upper surface section 61A and side surface section 61B, wherein a first mark (for example, mark 310) and a second mark (for example, mark 320) are formed on a lower surface of upper surface section 61A. The input operation device further includes light guide body 62 having upper surface section 62A and side surface section 62B. An upper end of side surface section 61B of light guide body 61 is connected to upper surface section 61A of light guide body 61, and a lower end of side surface section 61B of light guide body 61 faces light-emitting section 210 (light-emitting elements 41) and light-emitting section 220 (light-emitting elements 42). The first mark (for example, mark 310) emits light on upper surface section 61A of light guide body 61 when light is incident on light guide body 61 from light-emitting section 210. The second mark (for example, mark 320) emits light on upper surface section 61A of light guide body 61 when light is incident on light guide body 61 from light-emitting section 220 (light-emitting elements 42). At least one of light guide body 61 and light guide body 62 is treated to enable light emission with gradation.

According to the configuration described above, the function can be implemented for allowing an occupant to visually recognize the operating state by superimposing gradation display on the mark, as in the configuration of varying luminance. Specifically, for example, mark 320 is used as a mark for indicating that an air-conditioner is being activated, and if the temperature in the vehicle interior reaches a set temperature, light emission with gradation is provided. According to this configuration, the occupant can find the temperature state in the vehicle interior only by viewing the light emission state of gradation.

In input operation device 100 described above, side surface section 61B of light guide body 61 and side surface section 62B of light guide body 62 are columnar. However, they are not necessarily columnar.

That is, the side surface section of light guide body 61 is not necessarily columnar, and may only have at least two side surface sections (hereinafter referred to as a first side surface section and a second side surface section). It is only necessary that an upper end of the first side surface section is connected to upper surface section 61A of light guide body 61, a lower end of the first side surface section faces light-emitting section 210, an upper end of the second side surface section is connected to upper surface section 61A of light guide body 61, and a lower end of the second side surface section faces light-emitting section 220.

In the present exemplary embodiment, the side surface section of light guide body 61 is tubular. Specifically, the present exemplary embodiment describes an example in which the first side surface section and the second side surface section are integrally formed.

In input operation device 100 described above, mark 310 and mark 320 which can emit light with constant luminance are formed on light guide body 61, and light guide body 62 is treated to enable surface light emission with gradation.

Specifically, one of light guide body 61 and light guide body 62 has a first emission region which is treated to enable light emission with gradation, and one of light guide body 61 and light guide body 62 has a second emission region which is treated to enable light emission with constant luminance. The first emission region and the second emission region are different from each other.

More preferably, as in the present exemplary embodiment, the second emission region which is treated to enable light emission with constant luminance is formed on light guide body 61, and at least one of the first mark (mark 310) and the second mark (mark 320) is formed on the second emission region (a portion of the lower surface of light guide body 61).

While input operation device 100 described above has light-emission section 240 and light guide body 63 corresponding to light-emitting section 240, it does not necessarily have light-emitting section 240 and light guide body 63. In addition, input operation device 100 may be configured not to include light-emitting section 230 and light guide body 62 corresponding to light-emitting section 230. If including at least light guide body 61 and light-emitting sections 210 and 220, input operation device 100 can be configured to be capable of switching and displaying a plurality of marks on one input operation section.

Note that mark 310 and mark 320 are formed on upper surface section 61A of same light guide body 61 in the present exemplary embodiment. However, it is not necessary that mark 310 and mark 320 are formed on upper surface section 61A. The region where mark 310 and mark 320 are formed is not limited, so long as mark 310 and mark 320 can be switched and displayed on the same display region.

The region illuminated by light guide body 62 may be set to overlap the region where mark 310 or mark 320 is displayed on light guide body 61.

The outer shapes or the like of light guide body 61 and light guide body 62 may be set as appropriate. The outer shapes of light guide body 61 and light guide body 62 are not limited to the shapes in the present exemplary embodiment. Light-emitting sections 210, 220, and 230 may be arranged according to the outer shapes or the like of light guide body 61 and light guide body 62. It is preferable that light-emitting section 210 and light-emitting section 220 be arranged to have the point symmetrical relation as described above. However, the arrangement thereof may not be limited thereto.

Modification of Exemplary Embodiment

Figure 12:
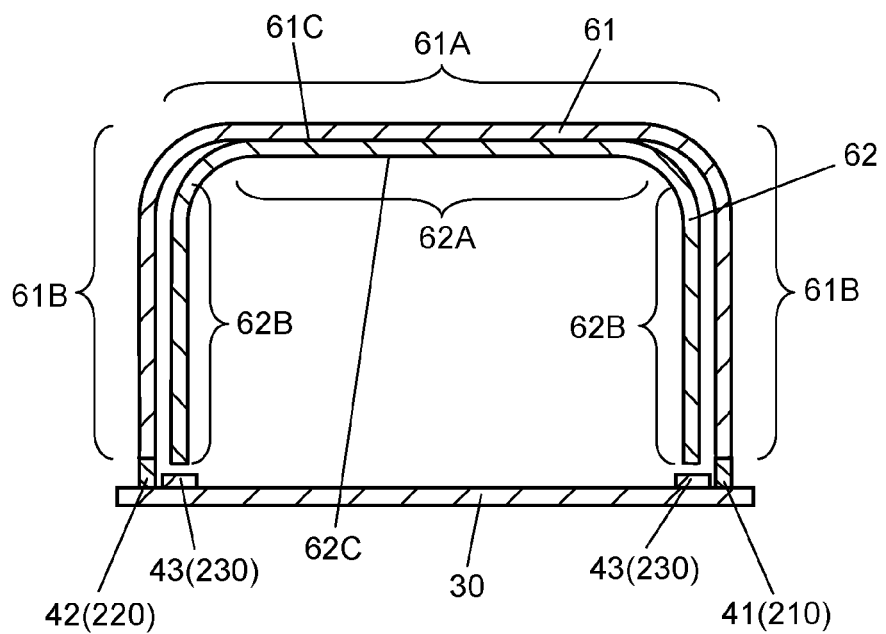
FIG. 12 is a schematic view for describing the positional relation between light guide bodies and light-emitting sections in an input operation device according to a modification of the exemplary embodiment.

Next, a modification of the present exemplary embodiment will be described with reference to FIG. 12.

In the exemplary embodiment described above, upper surface section 62A of light guide body 62 is located above light guide body 61 as illustrated in FIG. 11. On the other hand, in the present modification of the exemplary embodiment illustrated in FIG. 12, upper surface section 61A of light guide body 61 is located above light guide body 62. In addition, the arrangement of light-emitting sections 210, 220, and 230 is changed from the arrangement in the exemplary embodiment so that the end face of light guide body 61 faces light-emitting section 210 and light-emitting section 220, and the end face of light guide body 62 faces light-emitting section 230.

The other configurations are the same as those in FIG. 11, and the description thereof will be omitted.

In the configuration in FIG. 12, light guide body 62 for gradation or varying luminance is provided below light guide body 61 for displaying a mark. Therefore, compared to the arrangement in FIG. 11, the emission of gradation and variation in luminance does not interfere with the emission of the mark, whereby visibility can further be improved.

Specifically, in the present modification of the exemplary embodiment, for example, the emission region which is treated to enable light emission with gradation is formed on light guide body 62, the second emission region (region on which mark 310 or mark 320 is formed) which is treated to enable light emission with constant luminance is formed on light guide body 61, and upper surface section 61A of light guide body 61 is placed above second light guide body 62.

According to this configuration, when mark 310 or mark 320 and light emission with gradation are displayed as being overlapped with each other, the mark can more clearly be displayed than the arrangement in FIG. 11.

Note that, in the exemplary embodiment and the modification of the exemplary embodiment described above, the detailed configuration of operation knob 110 is not limited to the configuration described above. The present disclosure is applicable to something other than operation knob 110. For example, the present disclosure may be applied to input operation sections of various electronic devices, besides automobiles.

INDUSTRIAL APPLICABILITY

The input operation device according to the present disclosure can switch and display a mark on the same display region of an input operation section. The input operation device is effective mainly when being mounted to various electronic devices, a vehicle interior of a vehicle, and the like.

REFERENCE MARKS IN THE DRAWINGS 1 center console
3 center armrest
5 instrument panel
7 air-conditioning operation panel
9 display
20 case section
20A upper case
20B lower case
20C intermediate case
25 knob structure
25A substrate holder
25B knob holder
25C rotary member holder
25D knob top surface
25E top surface holder 25F ring-shaped operation member
30, 90 wiring board
41, 42, 43, 44 light-emitting element
50 design plate
61, 62, 63 light guide body
61A, 62A upper surface section
61B, 62B side surface section
61C, 62C lower surface
70 tubular body
75 touch sensor
81, 82 switch
100 input operation device
110 operation knob
120 push switch section
120A button member
210, 220, 230, 240 light-emitting section
310, 320, 330 mark

The invention claimed is:

1. An input operation device comprising:
a substrate;
a first light-emitting section disposed on an upper surface of the substrate;
a second light-emitting section disposed on the upper surface of the substrate;
a third light-emitting section disposed on the upper surface of the substrate;
a first light guide body which has an upper surface section and a side surface section, and has a first mark and a second mark formed on a lower surface of the upper surface section; and
a second light guide body having an upper surface section and a side surface section,
wherein
an upper end of the side surface section of the first light guide body is connected to the upper surface section of the first light guide body, and a lower end of the side surface section of the first light guide body faces the first light-emitting section and the second light-emitting section,
the first mark emits light on the upper surface section of the first light guide body when light is incident on the first light guide body from the first light-emitting section,
the second mark emits light on the upper surface section of the first light guide body when light is incident on the first light guide body from the second light-emitting section,
the upper surface section of the second light guide body emits light when light is incident on the second light guide body from the third light-emitting section, and
at least one of the first light-emitting section, the second light-emitting section, and the third light-emitting section is capable of changing light emission luminance.

2. The input operation device according to claim 1, wherein
the side surface section of the first light guide body has a first side surface section and a second side surface section,
an upper end of the first side surface section is connected to the upper surface section of the first light guide body and a lower end of the first side surface section faces the first light-emitting section, and
an upper end of the second side surface section is connected to the upper surface section of the first light guide body and a lower end of the second side surface section faces the second light-emitting section.

3. The input operation device according to claim 1, further comprising
a knob structure that enables an input operation,
wherein
light emission states of the first light-emitting section, the second light-emitting section, and the third light-emitting section are switched by operating the knob structure.

4. The input operation device according to claim 1, wherein
on the first light guide body, a region where the first mark is formed and a region where the second mark is formed are at least partially overlapped with each other.

5. An input operation device comprising:
a substrate;
a first light-emitting section disposed on an upper surface of the substrate;
a second light-emitting section disposed on the upper surface of the substrate;
a third light-emitting section disposed on the upper surface of the substrate;
a first light guide body which has an upper surface section and a side surface section, and has a first mark and a second mark formed on a lower surface of the upper surface section; and
a second light guide body having an upper surface section and a side surface section,
wherein
an upper end of the side surface section of the first light guide body is connected to the upper surface section of the first light guide body, and a lower end of the side surface section of the first light guide body faces the first light-emitting section and the second light-emitting section,
the first mark emits light on the upper surface section of the first light guide body when light is incident on the first light guide body from the first light-emitting section,
the second mark emits light on the upper surface section of the first light guide body when light is incident on the first light guide body from the second light-emitting section,
the upper surface section of the second light guide body emits light when light is incident on the second light guide body from the third light-emitting section, and
at least one of the first light guide body and the second light guide body is treated to enable light emission with gradation.

6. The input operation device according to claim 5, wherein
one of the first light guide body and the second light guide body has a first emission region which is treated to enable light emission with gradation,
one of the first light guide body and the second light guide body has a second emission region which is treated to enable light emission with constant luminance, and
the first emission region and the second emission region are different from each other.

7. The input operation device according to claim 5, wherein
the side surface section of the first light guide body has a first side surface section and a second side surface section,
an upper end of the first side surface section is connected to the upper surface section of the first light guide body and a lower end of the first side surface section faces the first light-emitting section, and an upper end of the second side surface section is connected to the upper surface section of the first light guide body and a lower end of the second side surface section faces the second light-emitting section.

8. The input operation device according to claim 5, further comprising
a knob structure that enables an input operation,
wherein
light emission states of the first light-emitting section, the second light-emitting section, and the third light-emitting section are switched by operating the knob structure.

9. The input operation device according to claim 5, wherein
on the first light guide body, a region where the first mark is formed and a region where the second mark is formed are at least partially overlapped with each other.

10. The input operation device according to claim 6, wherein
the second emission region which is treated to enable light emission with constant luminance is formed on the first light guide body, and
at least one of the first mark and the second mark is formed on the second emission region.

11. The input operation device according to claim 6, wherein
the first emission region which is treated to enable light emission with gradation is formed on the second light guide body,
the second emission region which is treated to enable light emission with constant luminance is formed on the first light guide body, and
the upper surface section of the first light guide body is disposed above the second light guide body.

12. The input operation device according to claim 10, wherein
the first emission region which is treated to enable light emission with gradation is formed on the second light guide body,
the second emission region which is treated to enable light emission with constant luminance is formed on the first light guide body, and
the upper surface section of the first light guide body is disposed above the second light guide body.

* * * * *